No. 773,550. PATENTED NOV. 1, 1904.
C. DIHLMANN.
FRAME FOR ELECTRIC MACHINES.
APPLICATION FILED NOV. 23, 1901.
NO MODEL. 2 SHEETS—SHEET 1.

WITNESSES
INVENTOR
Carl Dihlmann
by Max Georgii
his Attorney

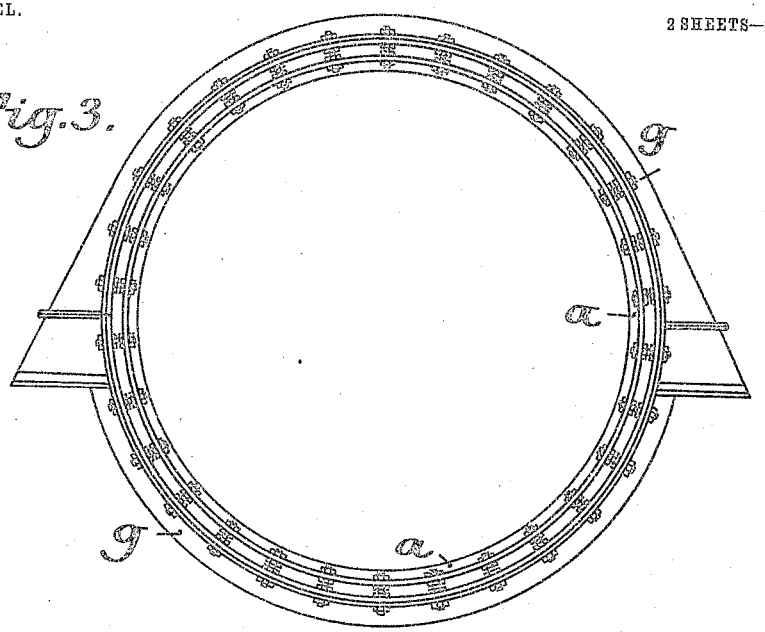
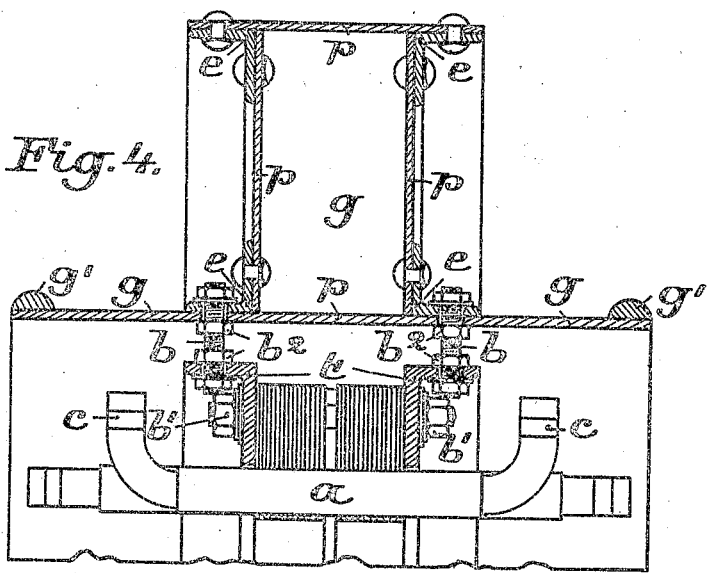

No. 773,550.

Patented November 1, 1904.

UNITED STATES PATENT OFFICE.

CARL DIHLMANN, OF BERLIN, GERMANY.

FRAME FOR ELECTRIC MACHINES.

SPECIFICATION forming part of Letters Patent No. 773,550, dated November 1, 1904.

Application filed November 23, 1901. Serial No. 83,407. (No model.)

*To all whom it may concern:*

Be it known that I, CARL DIHLMANN, manager, a subject of the German Emperor, residing at Berlin, 7ᵃ Tauenzienstrasse, Germany, have invented certain new and useful Improvements in Frames for Electric Machines; and I do hereby declare the following to be a full, clear, and exact description of the invention, such as will enable others skilled in the art to which it appertains to make and use the same.

My invention relates to improvements in the frames of electric alternating and multiphase current machines. Such frames for supporting the active laminated iron core carrying the field-magnet coils have been hitherto constructed of cast-iron. These frames are not only very heavy and expensive, especially in large machines, but also offer many difficulties in working and transporting the large cast-iron parts.

My invention has for its object to construct a frame for electric machines of pieces of wrought-iron, which is comparatively light and can be easily worked and transported, costs being thus diminished.

Figure 1:
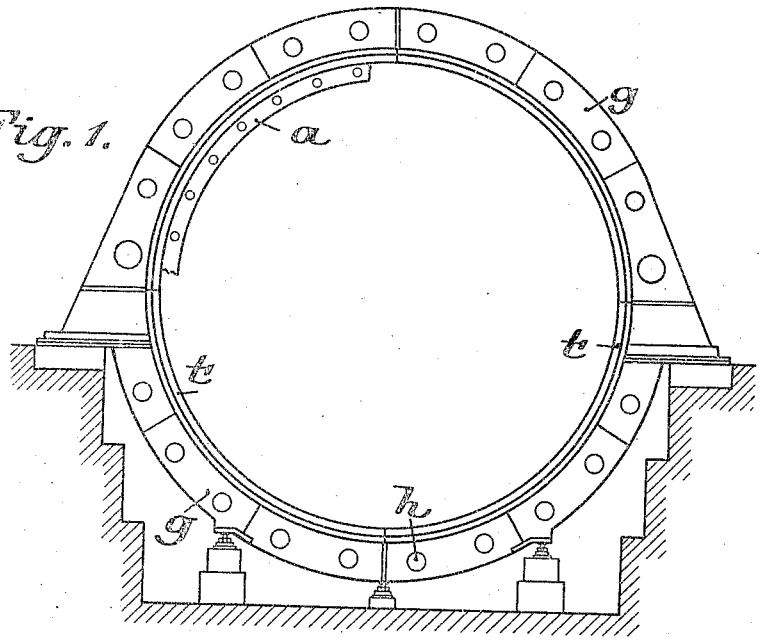
Figure 2:
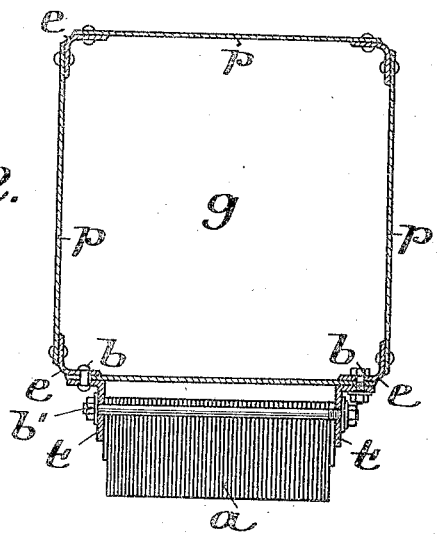

In the accompanying drawings, Figure 1 is a side elevation of a frame of an electric machine constructed according to my invention. Fig. 2 is a cross-section, in an enlarged scale, of the frame shown in Fig. 1. Figs. 3 and 4 show another modification of my invention in similar views as Figs. 1 and 2.

Referring to Fig. 1, $g$ is the supporting-frame of essentially annular shape and provided with any known means to carry and fasten it to the ground or any other base. To the inner side of the frame the active iron ring $a$ is fastened in any known way. In Fig. 2 a mode of fastening the ring $a$ is shown by way of example. For this purpose angle-irons $t$ are connected with the frame $g$ in any suitable way—for instance, by means of bolts $b$—and between the said angle-irons the active laminated core $a$ is firmly held by means of rods $b'$ passing across through the angle-irons and the core $a$ and secured therein by nuts. The frame $g$ itself is constructed as a hollow annular body and consists of plates $p$, which are connected to each other by means of angle-irons $e\ e$. The plates $p$ may be provided with holes $h$, Fig. 1, for ventilating the machine or similar purposes.

In the modification shown in Figs. 3 and 4 the inner plate $p$ is extended on both sides in order to form a shield $g$, which protects the projecting coils $c$ against injury in transporting the machine. For strengthening and stiffening the shields $g$ the edges thereof are preferably provided with ribs $g'$.

I prefer to fasten the angle-irons $t$, carrying the active iron $a$, to the frame in the manner shown by Figs. 3 and 4. The bolts $b$ are screw-bolts, carrying nuts $b^2$ between the inner plate $p$ of the frame and the angle-irons $t$, the latter being placed at a sufficient distance from the inner plate $p$ of the frame. By this arrangement I am enabled to compensate any deformation of the core by increasing the distance between the frame and the angle-irons $p$ at those places at which the core should be bulged and by drawing it out by means of the screws $b$ at those places at which it should be flattened.

I prefer to compose the frame of a number of single segments, as is shown by Fig. 1, the segments being connected with each other by any suitable means.

Having now particularly described and ascertained the nature of my said invention and the manner in which the same is to be performed, I declare that what I claim is—

1. In an alternating-current machine, the combination, with a core, of a tubular girder-frame arranged to support said core.

2. In an alternating-current machine, the combination, with a substantially circular core, of a girder-frame surrounding said core, and connections between the core and girder-frame whereby the core may be adjusted with relation to said girder-frame.

3. In an alternating-current machine, the combination, with a laminated core and a tubular girder-frame surrounding said core, of angle-irons arranged at each side of said core, means for clamping the laminæ of the core to said angle-irons, and means for connecting the angle-irons to the girder-frame.

4. In an alternating-current machine, the combination, with a laminated core and a tubular girder-frame surrounding said core, of angle-irons arranged at each side of said core, means for clamping the laminæ of the core to said angle-irons, and adjustable means for connecting said angle-irons to the girder-frame whereby the core may be adjusted with relation to the frame.

5. In an electric machine, the combination, with a core, of a tubular girder-frame composed of wrought-iron and arranged to support said core.

6. In an electric machine, the combination with an annular stationary core of a wrought-iron supporting girder-frame for said core, and connections between said frame and core.

7. In an electric machine, the combination, with a substantially annular core, of a girder-frame composed of wrought-iron and surrounding said core, and adjustable connections between the core and girder-frame whereby the core may be adjusted with relation to said frame.

8. In an electric machine, the combination, with an annular stationary core, of a supporting-frame consisting of a plurality of segments of wrought-iron.

9. In an electric machine, the combination, with a laminated core, and a tubular frame composed of wrought-iron and surrounding said core, of angle-irons arranged at each side of said core, means for clamping the laminæ of the core to said angle-irons, and means for connecting the angle-irons to the frame.

10. In an electric machine, the combination, with an active ring of laminated iron forming a core, of a supporting-frame comprising a plurality of segmental hollow bodies consisting of plates and angle-pieces of wrought-iron, to which frame the core is secured.

11. In an electric machine, the combination, with a laminated core, and a tubular girder-frame composed of wrought-iron and surrounding said core, of angle-irons arranged at each side of said core, means for clamping the laminæ of the core to said angle-irons, and adjustable means for connecting the angle-irons to the girder-frame, whereby the core may be adjusted with relation to the frame.

12. In an electric machine, the combination, with a laminated core, and a tubular girder-frame composed of wrought-iron and surrounding said core, of angle-irons arranged at each side of said core, means for clamping the laminæ of the core to said angle-irons, and threaded bolts connecting said angle-irons to the girder-frame and provided with two nuts interposed between the angle-iron and frame whereby the core may be adjusted with relation to the frame.

In testimony whereof I have affixed my signature in presence of two witnesses.

CARL DIHLMANN

Witnesses:
WOLDEMAR HAUPT,
HENRY HASPER.